(12) United States Patent
Johnsen et al.

(10) Patent No.: US 7,945,721 B1
(45) Date of Patent: May 17, 2011

(54) FLEXIBLE CONTROL AND/OR STATUS REGISTER CONFIGURATION

(75) Inventors: Bjørn Dag Johnsen, Oslo (NO); Ola Tørudbakken, Oslo (NO); Yatin Gajjar, Fremont, CA (US)

(73) Assignee: Oracle America, Inc., Redwood Shores, CA (US)

( * ) Notice: Subject to any disclaimer, the term of this patent is extended or adjusted under 35 U.S.C. 154(b) by 348 days.

(21) Appl. No.: 11/503,364

(22) Filed: Aug. 11, 2006

(51) Int. Cl.
*G06F 13/36* (2006.01)

(52) U.S. Cl. ............... 710/311; 710/8; 710/10; 710/104

(58) Field of Classification Search ............... 710/8, 10, 710/104, 311
See application file for complete search history.

(56) References Cited

U.S. PATENT DOCUMENTS

| | | | |
|---|---|---|---|
| 6,629,157 B1 * | 9/2003 | Falardeau et al. | 710/10 |
| 6,823,418 B2 * | 11/2004 | Langendorf et al. | 710/306 |
| 7,068,383 B1 * | 6/2006 | Bello et al. | 358/1.15 |
| 7,107,382 B2 * | 9/2006 | Clayton | 710/305 |
| 7,155,379 B2 * | 12/2006 | Oshins et al. | 703/21 |
| 7,356,686 B2 * | 4/2008 | Nakajima | 713/100 |
| 7,392,172 B2 * | 6/2008 | Rostampour | 703/26 |
| 2003/0097509 A1 * | 5/2003 | Fry et al. | 710/305 |
| 2003/0187904 A1 * | 10/2003 | Bennett et al. | 709/1 |
| 2004/0268347 A1 * | 12/2004 | Knauerhase et al. | 718/1 |
| 2005/0246478 A1 * | 11/2005 | Tanaka | 710/315 |
| 2006/0236016 A1 * | 10/2006 | Tetrick | 710/306 |
| 2006/0236094 A1 * | 10/2006 | Leung et al. | 713/152 |
| 2006/0241930 A1 * | 10/2006 | Oshins et al. | 703/24 |
| 2006/0242352 A1 * | 10/2006 | Torudbakken et al. | 710/312 |
| 2006/0248526 A1 * | 11/2006 | Rostampour | 718/1 |
| 2006/0253619 A1 * | 11/2006 | Torudbakken et al. | 710/31 |
| 2007/0044100 A1 * | 2/2007 | Panesar et al. | 718/102 |
| 2007/0266179 A1 * | 11/2007 | Chavan et al. | 709/250 |
| 2008/0005297 A1 * | 1/2008 | Kjos et al. | 709/223 |
| 2008/0320582 A1 * | 12/2008 | Chen et al. | 726/12 |

\* cited by examiner

*Primary Examiner* — Mark Rinehart
*Assistant Examiner* — Nimesh G Patel
(74) *Attorney, Agent, or Firm* — Park, Vaughan, Fleming + Dowler LLP

(57) ABSTRACT

A register access request for control and/or status operations from a link is detected using a hardware mechanism and is forwarded to a software-controlled entity for access to a virtual register for control and/or status operations. The software-controlled entity can provide virtual registers in memory associated with the software-controlled entity. The hardware mechanism can form part of an interconnect device and the software-controlled entity is external to the interconnect device.

19 Claims, 11 Drawing Sheets

| | | Byte Offset (Hex) |
|---|---|---|
| 31 ... 0 | | |
| Device ID | Vendor ID | 00 |
| Status | Command | 04 |
| Class Code | Revision ID | 08 |
| BIST | Header Type | Master Latency Timer | Cache Line Size | 0C |
| Base Address Register 0 | | 10 |
| Base Address Register 1 | | 14 |
| Secondary Latency Timer | Subordinate Bus Number | Secondary Bus Timer | Primary Bus Timer | 18 |
| Secondary Status | I/O Limit | I/O Base | 1C |
| Memory Limit | Memory Base | 20 |
| Prefetchable Memory Limit | Prefetchable Memory Base | 24 |
| Prefetchable Base Upper 32 Bits | | 28 |
| Prefetchable Base Lower 32 Bits | | 2C |
| I/O Limit Upper 16 Bits | I/O Limit Lower 16 Bits | 30 |
| Reserved | Capabilities Pointer | 34 |
| Expansion ROM Base Address | | 38 |
| Bridge Control | Interrupt Pin | Interrupt Line | 3C |

Fig. 6

| | Byte Offset (Hex) |
|---|---|
| 31 ............................................................. 0 | |
| Device ID \| Vendor ID | 00 |
| Status \| Command | 04 |
| Class Code \| Revision ID | 08 |
| BIST \| Header Type \| Master Latency Timer \| Cache Line Size | 0C |
| Base Address Registers | 10 |
|  | 14 |
|  | 18 |
|  | 1C |
|  | 20 |
|  | 24 |
| Cardbus CIS Pointer | 28 |
| Subsystem ID \| Subsystem Vendor ID | 2C |
| Expansion ROM Base Address | 30 |
| Reserved \| Capabilities Pointer | 34 |
| Reserved | 38 |
| Max_Lat \| Min_Gnt \| Interrupt Pin \| Interrupt Line | 3C |

Fig. 7

FLEXIBLE CONTROL AND/OR STATUS REGISTER CONFIGURATION

BACKGROUND

The present invention relates to managing configuration space.

In many computer environments, a fast and flexible interconnect system can be desirable to provide connectivity to devices capable of high levels of data throughput. In the fields of data transfer between devices in a computing environment PCI Express (PCI-E) can be used to provide connectivity between a host and one or more client devices or endpoints. PCI Express is becoming a de-facto I/O interconnect for servers and desktop computers. PCI Express allows physical system decoupling (CPU<->I/O) through high-speed serial I/O. The PCI Express Base Specification 1.0 sets out behavior requirements of devices using the PCI Express interconnect standard. According to the Specification, PCI Express is a host to endpoint protocol where each endpoint connects to a host and is accessible by the host. PCI Express imposes a stringent tree structure relationship between I/O Devices and a Root Complex.

PCI device design can be engineering intensive and multiple function devices require additional effort to implement register sets per added function. Hardware needs to present a consistent model to software but aspects of a design such as the functions, devices, embedded bridges, etc., might not be determined early in the design and might need to change during development.

In order to present a model to software, traditional devices include a set of hardware presentation registers that form a presentation interface for the device to a host. The presentation registers define the capabilities of device and address space requirements for the device and thus provide a standardized mechanism for software to be able to control controllable functions of one or more devices and to access status in respect of those functions. In the present application such a presentation layer, or interface is termed a configuration space and the presentation registers are termed Configuration Space registers, or CSRs. Although these are terms known in the context of PCI and PCI Express, it is to be understood that these terms are to be interpreted in the context of the present document to include other forms of presentation space and presentation registers and is not limited to PCI and PCI Express implementations.

In a situation where there can be a potentially large number of real and/or virtual resources, not only would the large number of registers needed take up a lot of real estate on an integrated circuit, the interconnects the registers would require when implemented as flip-flops would take up a considerable area of an interconnection device and indeed can limit the available number of devices that can be supported.

SUMMARY OF THE INVENTION

The present invention has been made, at least in part, in consideration of problems and drawbacks of conventional systems.

An aspect of the invention provides an apparatus that includes an interface operable to receive a register access request for control and/or status operations, a hardware mechanism operable to detect the register access request for forwarding to a software-controlled entity for access to a virtual register for control and/or status operations.

Another aspect of the invention provides a computer system comprising an interconnect apparatus. The interconnect apparatus includes a link interface operable to receive a register access request for control and/or status operations from a link, and a hardware mechanism operable to detect the register access request for forwarding to a software-controlled entity for access to a virtual register for control and/or status operations.

A further aspect of the invention includes a method that includes receiving a register access request for control and/or status operations from a link, detecting the register access request using a hardware mechanism and forwarding the register access request to a software-controlled entity for access to a virtual register for control and/or status operations.

Although various aspects of the invention are set out in the accompanying independent claims, other aspects of the invention include any combination of features from the described embodiments and/or the accompanying dependent claims with the features of the independent claims, and not solely the combinations explicitly set out in the accompanying claims.

BRIEF DESCRIPTION OF THE FIGURES

Specific embodiments of the present invention will now be described by way of example only with reference to the accompanying Figures in which:

FIG. 6 is a schematic structure overview for a Type 1 configuration header;

FIG. 7 is a schematic structure overview for a Type 0 configuration header;

Figure 1:
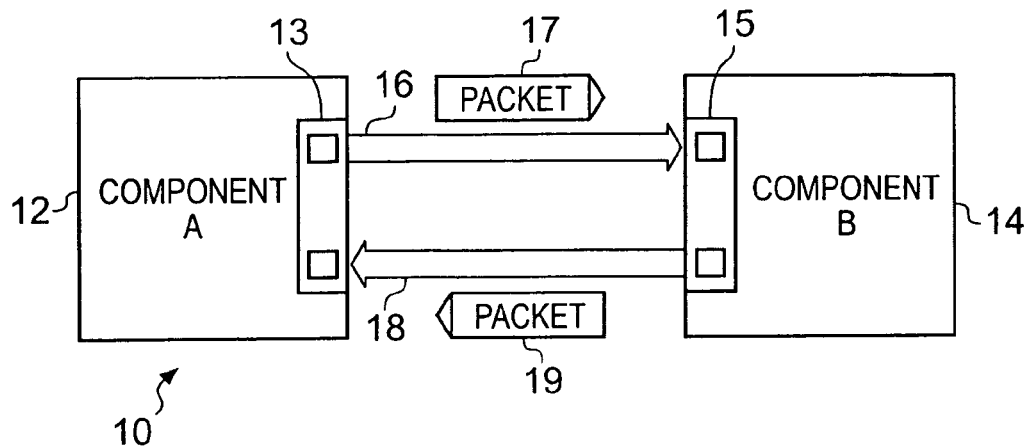
FIG. 1 is a schematic representation of a PCI Express connection.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments of the invention are described in the following with reference to an example of an interconnect apparatus for supporting PCI Express.

The PCI Express 1.0 standard set out in the PCI Express Base Specification 1.0 available from the PCI (Peripheral Component Interconnect) Special Interest Group (www.pcisig.com) is one example of a computer interconnect standard. The PCI Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI Express by a highly scalable, fully serial interface. Among the advanced features supported by PCI Express are Power Management, Quality of Service (QoS), Hot-Plug/Hot-Swap support, Data Integrity, and Error Handling. PCI Express is also backwards compatible with the software models used to describe PCI, such that PCI Express hardware can be detected and configured using PCI system configuration software implementations with no modifications.

With reference to FIG. 1, there will now be described the basic point-to-point communications channel provided by PCI Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two uni-directional, low-voltage, differentially driven channels 16 and 18 connect the ports of the components, one channel in each direction. The channel pair can be referred to as a lane. The channels 16 and 18 each carry packets 17 and 19 between the components. According to the PCI Express 1.0 specification, each lane provides a data transfer rate of 2.5 Gigabits/second/lane/direction. For circumstances where this data bandwidth is insufficient, to scale bandwidth, a link may aggregate multiple Lanes denoted by xN where N may be any of the supported Link widths. An x8 Link represents an aggregate bandwidth of 20 Gigabits/second of raw bandwidth in each direction. This base specification 1.0 describes operations for x1, x2, x4, x8, x12, x16, and x32 Lane widths. According to the specification only symmetrical links are permitted, such that a link includes the same number of lanes in each direction.

Figure 2:
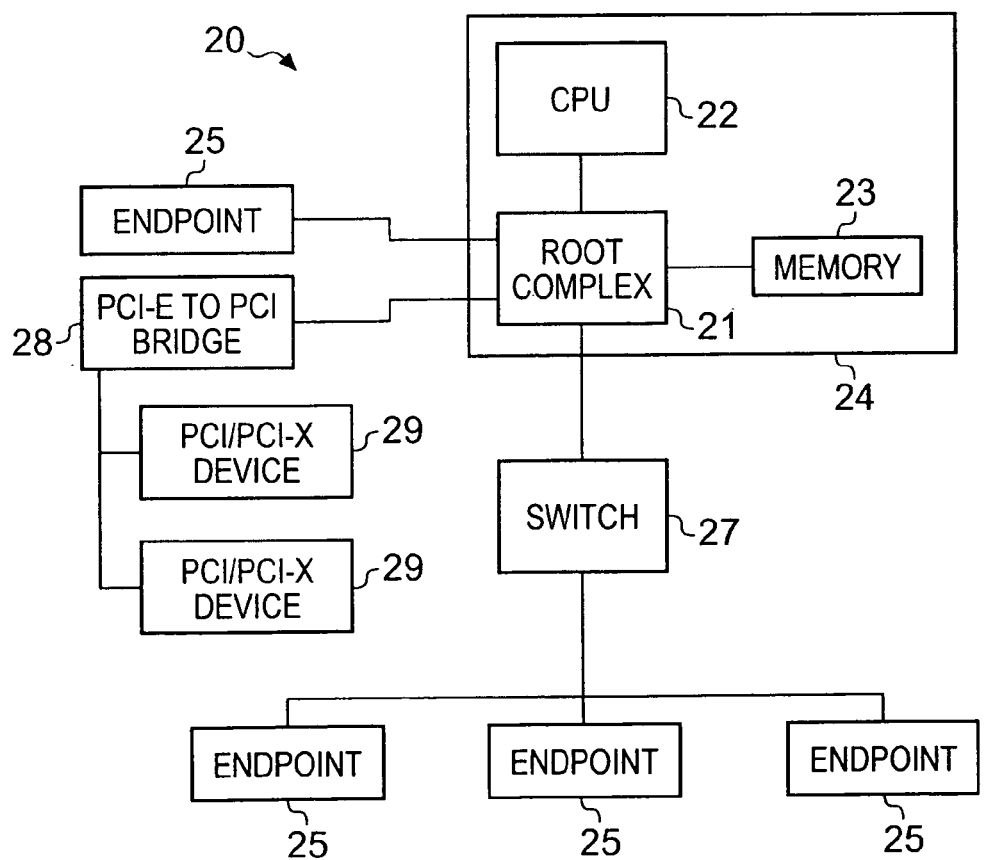
FIG. 2 is a schematic representation of an example of a PCI Express fabric topology.

With reference to FIG. 2, there will now be described an example of a PCI Express fabric topology 20. A fabric is composed of point-to-point links that interconnect a set of components. In the example of FIG. 2, there is shown a single fabric instance 20 referred to as a hierarchy, composed of a root complex 21, multiple endpoints 25 (such as I/O devices), a switch 27, and a PCI Express to PCI Bridge 28, all interconnected via PCI Express Links. The root complex 21 can be connected to a CPU 22 and memory 23 subsystem which requires access to the I/O facilitated by the PCI Express Fabric. The combination of root complex, CPU and memory can be referred to as a host 24. Each of the components of the topology is mapped in a single flat address space and can be accessed using PCI-like load/store accesses transaction semantics.

A root complex (RC) 21 is the root of an I/O hierarchy that connects the CPU/memory subsystem to the I/O. As illustrated in FIG. 2, a root complex 21 may support one or more PCI Express Ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 25 is a type of device that can be the requester or completer of a PCI Express transaction either on its own behalf or on behalf of a distinct non-PCI Express device (other than a PCI device or Host CPU). Examples of endpoints include: a PCI Express attached graphics controller, a PCI Express-USB host controller, and a PCI Express attached network interface such as an Ethernet MAC/PHY or Infiniband Host Channel Adapter (HCA).

Figure 3:
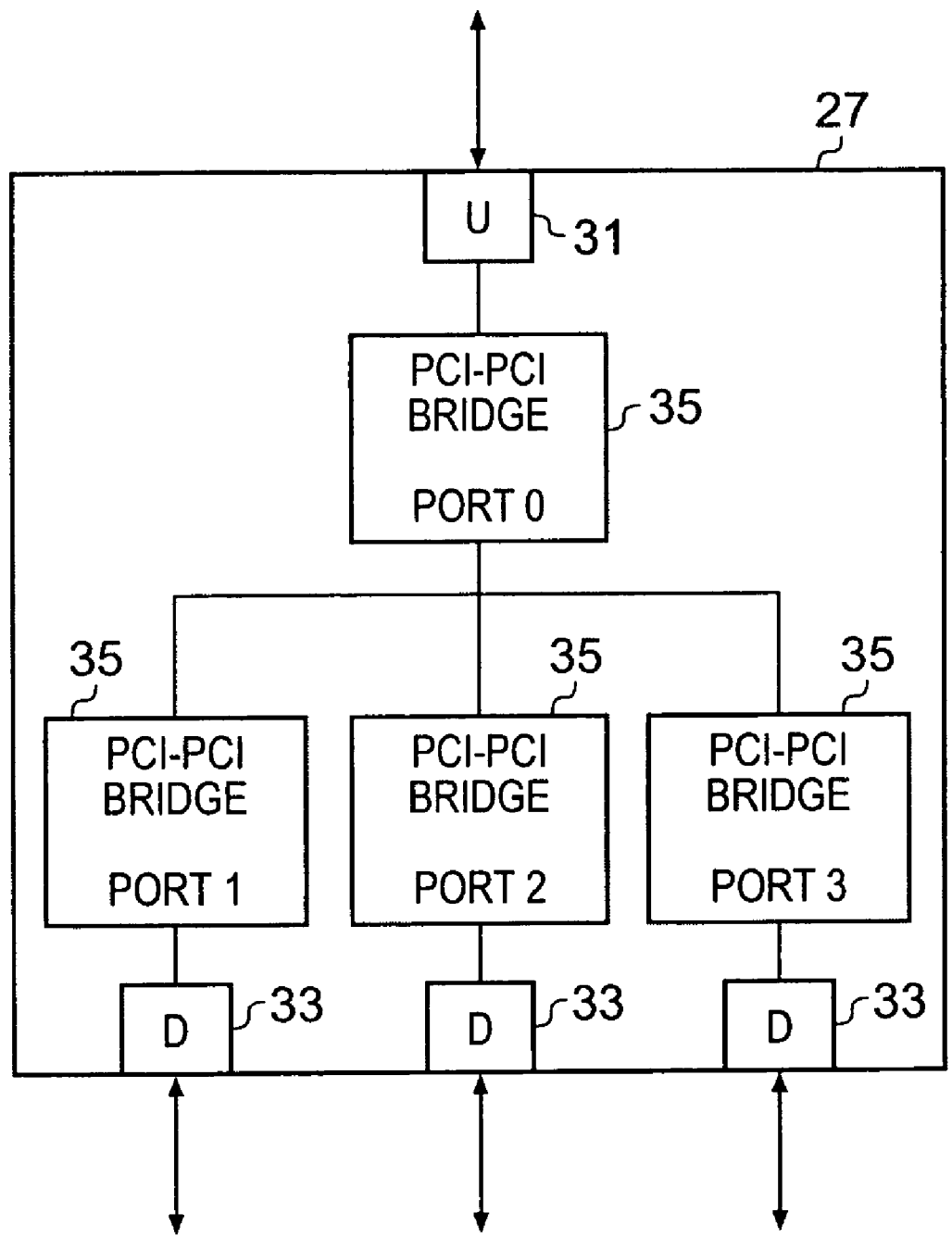
FIG. 3 is a schematic representation of a PCI Express switch.

A switch 27 is a logical assembly of multiple virtual PCI Express to PCI Express bridge devices as illustrated in FIG. 3. As shown in FIG. 3, an upstream port 31 which connects in the direction of a host connects to a number of downstream ports 33 via a switch fabric made up of a number of virtual PCI Express to PCI Express bridges. Switches are governed by a number of rules. Amongst these rules is a requirement that switches appear to configuration software as two or more logical virtual PCI Express to PCI Express Bridges and forward transactions using PCI Bridge mechanisms; e.g., address based routing. Also, a switch is not allowed to split a packet into smaller packets, e.g., a single packet with a 256-byte payload must not be divided into two packets of 128 bytes payload each. Each virtual PCI Express to PCI Express bridge 35 can be a physical PCI Express to PCI Express bridge or can be an alternative physical structure which is controlled to behave as a PCI Express to PCI Express bridge.

With reference to FIG. 2, it is noted that a PCI Express to PCI Bridge 28 can provide a connection between a PCI Express fabric and a PCI/PCI-X hierarchy. Thereby, conventional PCI/PCI-X devices 29 may be connected to the PCI Express fabric and accessed by a host including a PCI Express root complex.

A PCI Express fabric can be configured using one of two mechanisms. These are: a PCI compatible configuration mechanism which supports 100% binary compatibility with operating systems and host firmware and their corresponding bus enumeration and configuration software that is compatible with, for example, PCI rev 3.0 or later; and a PCI Express enhanced configuration mechanism which is provided to increase the size of available configuration space and to optimize access mechanisms.

Each PCI Express Link is mapped through a virtual PCI-to-PCI Bridge structure and has a logical PCI bus associated with it. The virtual PCI-to-PCI Bridge structure may be part of a PCI Express Root Complex Port, a Switch Upstream Port, or a Switch Downstream Port. A Root Port is a virtual PCI-to-PCI Bridge structure that originates a PCI Express hierarchy domain from a PCI Express Root Complex. Logical devices are mapped into configuration space such that each will respond to a particular device number. In the present case the device number is a Bus, Device, Function number (BDF). A BDF can comprise a 16-bit field including a Bus Number (8-bit, BN), a Device Number (5-bit, DN) and a Function Number (3-bit, FN).

Figure 4:
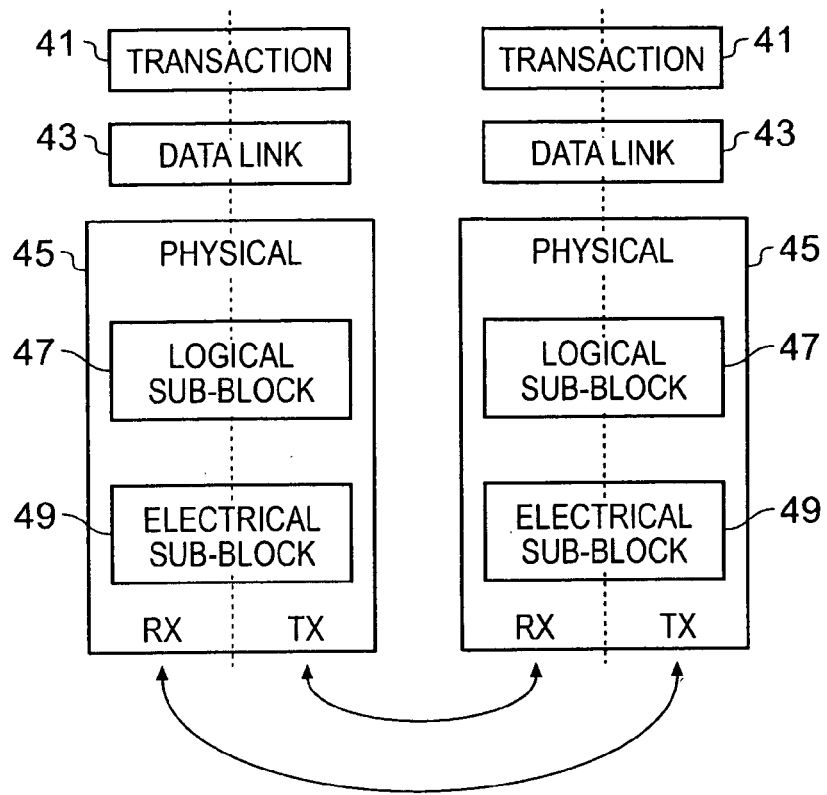
FIG. 4 is a schematic overview of layering within PCI Express.

A schematic overview of the PCI Express architecture in layers is shown in FIG. 4. As shown, there are three discrete logical layers: the Transaction Layer 41, the Data Link Layer 43, and the Physical Layer 45. Each of these layers is divided into two sections: one that processes outbound (to be transmitted) information and one that processes inbound (received) information.

PCI Express uses packets to communicate information between components. Packets are formed in the Transaction and Data Link Layers to carry the information from the transmitting component to the receiving component. As the transmitted packets flow through the other layers, they are extended with additional information necessary to handle packets at those layers. At the receiving side the reverse process occurs and packets get transformed from their Physical Layer representation to the Data Link Layer representation and finally (for Transaction Layer Packets) to the form that can be processed by the Transaction Layer of the receiving device.

Figure 5:
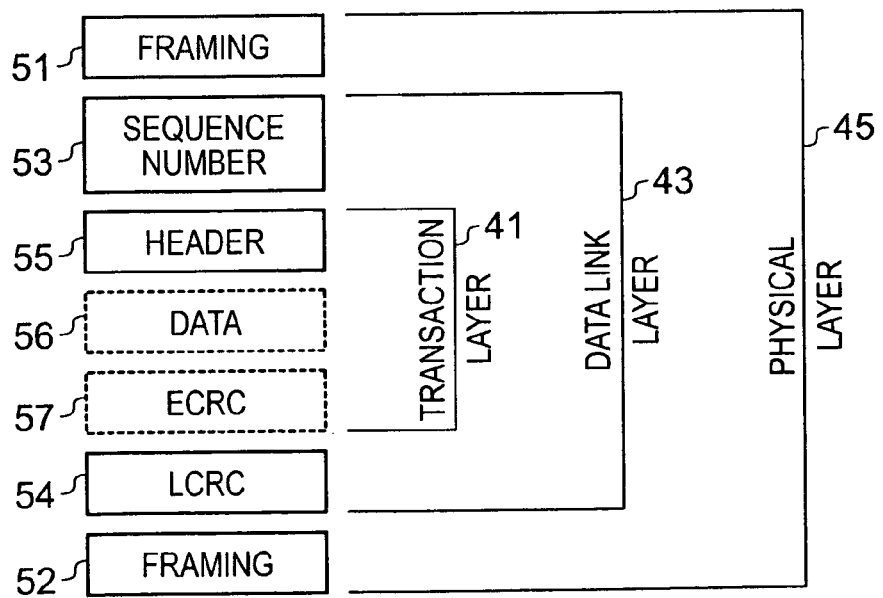
FIG. 5 is a schematic representation of packet flow showing data encapsulation through the PCI-E logic layers shown in FIG. 4.

A conceptual overview of the flow of transaction level packet information through the layers is shown in FIG. 5. Thus the Transaction Layer 41 provides a packet header 55, and can provide a data payload 56 and an optional end-to-end cyclic redundancy check (ECRC) 57. The data link layer applies a sequence number 53 and a LCRC (Link Cyclic Redundancy Check) 54. The Physical Layer 45 then provides Framing 51, 52 for the packet. A simpler form of packet communication is supported between two Data Link Layers (connected to the same Link) for the purpose of Link management.

The upper Layer of the architecture is the Transaction Layer 41. The Transaction Layer's primary responsibility is the assembly and disassembly of Transaction Layer Packets (TLPs). TLPs are used to communicate transactions, such as read and write, as well as certain types of events. The Transaction Layer is also responsible for managing credit-based flow control for TLPs.

Every request packet requiring a response packet is implemented as a split transaction. Each packet has a unique identifier that enables response packets to be directed to the correct originator. The packet format supports different forms of routing or addressing depending on the type of the transaction. In this example, memory and I/O requests are routed based upon address, completions and configuration requests are routed based upon BDFs, and messages are implicitly routed to the root complex. The Packets may also have attributes such as No Snoop and Relaxed Ordering.

The transaction Layer supports four address spaces: the three PCI address spaces (memory, I/O, and configuration) and a Message Space. According to the PCI Express specification, the Message Space is used for error handling and to support all prior sideband signals, such as interrupt emulation, power-management requests, and so on, as in-band Message transactions. PCI Express Message transactions can be considered as "virtual wires" since their effect is to eliminate the wide array of sideband signals used in a conventional platform implementation.

The middle Layer in the stack, the Data Link Layer 43, serves as an intermediate stage between the Transaction Layer 41 and the Physical Layer 45. The primary responsibilities of the Data Link Layer 41 include Link management and data integrity, including error detection and error correction.

The transmission side of the Data Link Layer 43 accepts TLPs assembled by the Transaction Layer 41, calculates and applies a data protection code and TLP sequence number, and submits them to Physical Layer 45 for transmission across the Link. The receiving Data Link Layer 43 is responsible for checking the integrity of received TLPs and for submitting them to the Transaction Layer 41 for further processing. On detection of TLP error(s), this Layer is responsible for requesting retransmission of TLPs until information is correctly received or the Link is determined to have failed.

The Data Link Layer 43 also generates and consumes packets that are used for Link management functions. To differentiate these packets from those used by the Transaction Layer (TLP), the term Data Link Layer Packet (DLLP) is used when referring to packets that are generated and consumed at the Data Link Layer.

The Physical Layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The Physical Layer 45 exchanges information with the Data Link Layer 43 in an implementation-specific format. The Physical Layer is responsible for converting information received from the Data Link Layer 43 into an appropriate serialized format and transmitting it across the PCI Express Link at a frequency and width compatible with the device connected to the other side of the Link.

The PCI Express architecture has various facilities to support future performance enhancements via speed upgrades and advanced encoding techniques. Depending on actual implementation of these enhancements, the future speeds, encoding techniques or media may only impact the Physical Layer definition.

The Transaction Layer 41, in the process of generating and receiving TLPs, exchanges Flow Control information with its complementary Transaction Layer 41 on the other side of the Link. It also supports both software and hardware-initiated power management.

Initialization and configuration functions require the Transaction Layer 41 to store Link configuration information generated by the processor or management device and store Link capabilities generated by Physical Layer hardware negotiation of width and operational frequency A Transaction Layer's Packet generation and processing services require it to: generate TLPs from device core Requests; convert received Request TLPs into Requests for the device core; convert received Completion Packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the Transaction Layer 41 tracks flow control credits for TLPs across the Link. Transaction credit status is periodically transmitted to the remote Transaction Layer using transport services of the Data Link Layer. Remote Flow Control information is used to throttle TLP transmission.

The transaction layer 41 can also implement ordering rules including the PCI/PCI-X compliant producer consumer ordering model and extensions to support relaxed ordering.

Power management services within the transaction layer 41 may include: ACPI/PCI power management, as dictated by system software; and hardware-controlled autonomous power management minimizes power during full-on power states.

The transaction layer 41 can also implement handling of Virtual Channels and Traffic Class. The combination of Virtual Channel mechanism and Traffic Class identification is provided to support differentiated services and QoS (Quality of Service) support for certain classes of applications. Virtual Channels provide a means to support multiple independent logical data flows over given common physical resources of the Link. Conceptually this involves multiplexing different data flows onto a single physical Link. The Traffic Class is a Transaction Layer Packet label that is transmitted unmodified end-to-end through the fabric. At every service point (e.g., Switch) within the fabric, Traffic Class labels are used to apply appropriate servicing policies. Each Traffic Class label defines a unique ordering domain—no ordering guarantees are provided for packets that contain different Traffic Class labels.

The Data Link Layer 43 is responsible for reliably exchanging information with its counterpart on the opposite side of the Link. Accordingly, it has responsibility for initialization and power management services to: accept power state requests from the Transaction Layer 41 and convey them to the Physical Layer 45; and convey active/reset/disconnected/power managed state information to the Transaction Layer 41.

The data link layer 43 also provides data protection, error checking, and retry services including: CRC generation; transmitted TLP storage for data link level retry; error checking; TLP acknowledgment and retry messages; and error indication for error reporting and logging.

The Physical Layer 45 provides services relating to interface initialization, maintenance control, and status tracking, including: Reset/Hot-Plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths>x1) at receiving side. The physical layer 45 can also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI Express link; TLP framing information for the received byte; actual power state for the Link; and Link status information.

The data link to physical interface provides: byte or multi-byte wide data to be sent across the link (including a data transfer handshake mechanism, and TLP and DLLP boundary information for bytes); and requested power state for the Link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

As described above, a PCI Express switch provides a single upstream port and one or more downstream ports. Configuration of the ports can be carried out using the PCI Express configuration space headers. Examples of relevant headers are shown in FIG. 6. Each port typically behaves as a PCI Express to PCI Express bridge as specified by the PCI Express Base Specification and P2P Bridge Specification (and can therefore be considered to be a virtual PCI Express to PCI Express bridge (P2P)). Each P2P bridge is identified through a class code register in a Type 1 header being equal to a P2P (0x060400). Note that in accordance with the PCI Express specification, a PCI Express endpoint control and status register description is defined as a Type 0 and a P2P control and status register is defined as a Type 1. The class code is part of the control and status register in the Type 0/1 headers.

A conventional PCI Express switch is shown in FIG. 3 and described above. During system initialization, a bus-walk is performed by the system platform 24 (the owner of root complex 21). The bus-walk takes place as a series of configuration requests. Each device in a PCI Express hierarchy (including a switch port P2P device) is identified using a BDF. Each transaction layer packet which is transferred over the fabric includes a Requester ID field which is equal to the BDF of the requester of a transaction. In some cases, the packet may also include a Completer ID, which is the BDF of the completer of the transaction.

During the bus-walk, the system platform performs bus enumeration by conducting a series of configuration requests to the appropriate registers within the Type 0/1 headers of each device in the PCI Express hierarchy. This process assigns each device a unique BDF.

For example, in the switch shown in FIG. 3, the upstream port (PORT 0) may have a primary bus number of 1 (00000001), a secondary bus number of 2 (00000010) (being a bridge, the P2P has one bus number for each bus to which it is connected), a device number of 0 (00000) in accordance with the PCI Express specification, and a function number of 0 (000). The upstream port is identified as an upstream port through PCI Express Capabilities CSR Device Port Type field (the location of which is identified by the capability pointer field in the header) of the P2P control and status register within the upstream port Type 1 configuration header. Each downstream port (PORT 1, PORT 2, and PORT 3) has a primary bus number of 2 (00000010), and respective ports may have respective device numbers, e.g., PORT 1 may have device number 1 (00001), PORT 2 may have device number 2 (00010), and PORT 3 may have device number 3 (00011). In the case of the devices attached to the ports being single function devices, each will have a function number of 0 (000). If the attached devices were to be multi-function devices, the first function of any given device will be 0, with further functions being assigned function numbers in the range 1-7 as made possible by the three bits of the function number.

All P2P bridges are accessed through Type 1 configuration requests, and during enumeration the host platform/root complex accesses registers within the bridge's Type 1 configuration space. An example of the PCI Express Type 1 configuration space header is shown in FIG. 6. As can be seen from the Figure, the Type 1 header includes fields identifying the device (Device ID, which is a physical device identifier, and Vendor ID, which is an identifier of the vendor company of the device). The Type 1 header also includes fields describing the status of the device (Status and Command, which is the Command and Status Register that provides status and control over the PCI Express interface). The Class Code field is used to define the type of device, as indicated above the P2P bridge is identified by a class code of 0x060400. The Type 1 header also has fields to identify the primary and secondary bus numbers of the P2P, and fields for BARs, and Base/Limit fields. The remaining fields are not of direct relevance to the present discussion, so in the interests of not obscuring the present disclosure, the reader's attention is directed to the PCI Express base specification for full details of these fields.

The downstream ports are accessed using Type 1 configuration requests with a BDF of {BN=virtual PCI Bus (2 in FIG. 3), DN=actual port/device, FN=function number within device implementing port}.

Also, respective ports may have respective secondary bus numbers, e.g., PORT 1 may have secondary bus number 3 (00000011), PORT 2 may have secondary bus number 4 (00000100), and PORT 3 may have secondary bus number 5 (00000101). Any of the devices may have a subordinate bus number (also identified in the Type 1 header) depending on the way in which the device is connected to the port. In the present example, it is assumed that device 3 connects to PORT 3 via a further P2P device. That further P2P has a primary bus number of 5 and a secondary bus number of 6, thus the subordinate bus number of PORT 3 in the present example is 6 (00000110). The subordinate bus number is the last bus number in the downstream hierarchy of a given port. The upstream port forwards Type 1 configuration requests to downstream ports when the configuration requests target a downstream port's subordinate bus. In case of an endpoint device being directly connected to a downstream port, the downstream P2P converts the Type 1 configuration request into a Type 0 configuration request. An example of the Type 0 configuration space header is shown in FIG. 7. As can be seen from that Figure, many of the fields are common to both Type 0 and Type 1 headers.

Of the fields in the Type 0 header which are not used in the Type 1 header, the Min_Gnt and Max_Lat headers are not used in PCI Express and are set to 0 value and read only status for PCI Express configuration. The remaining fields are not of direct relevance to the present discussion, so in the interests of not obscuring the present disclosure, the reader's attention is directed to the PCI Express base specification for full details of these fields.

During configuration, memory space requested by devices is discovered and allocated by the platform. After configuration, the memory base/limit registers (BLRs) of a given port reflects the cumulative BARs for all downstream devices (i.e. downstream devices are mapped in contiguous address regions). For example, the BLR of PORT 1 may have a base of x0200 and a limit of x02FF, the BLR of PORT 2 may have a base of x0300 and a limit of x03FF, and the BLR of PORT 3 may have a base of x0400 and a limit of x04FF. Thus the BLR of PORT 0 must have a base of x0200 or lower and a limit of x04FF or higher. As each PORT has its own BLR space defined in the Type 1 header, PORT 0 must also have a BLR space for itself, thus in the present example, PORT 0 has a BLR with a base of x0200 and a limit of x04FF. There are independent BLRs for each of the three PCI address spaces. The I/O BLR has a 16 or 32-bit address, the memory BLR has a 32-bit address, and the prefetch memory BLR has a 32 or 64-bit address. According to the PCI Express specification, all PCI Express endpoints with the prefetchable bit set must support 64-bit addressing. To simplify address decoding, the I/O BLR supports 4k page granularity, and the memory BLRs use 1 MB granularity. Fields are provided in the Type 1 header to identify the address ranges in the prefetchable, I/O and memory categories.

Memory requests & I/O requests are routed based upon address. In the downstream direction a request is forwarded (or processed) if the address falls within the port's BLR. Upstream forwarding is based upon inverse decode relative to the same BLRs. Within a switch each P2P (port) provides separate BLR registers for each of the three address spaces. In order for a port to make a forwarding decision, it must have explicit knowledge of the other ports' BLR ranges.

Thus the initialization and configuration of a PCI Express switch have been described.

Figure 8:
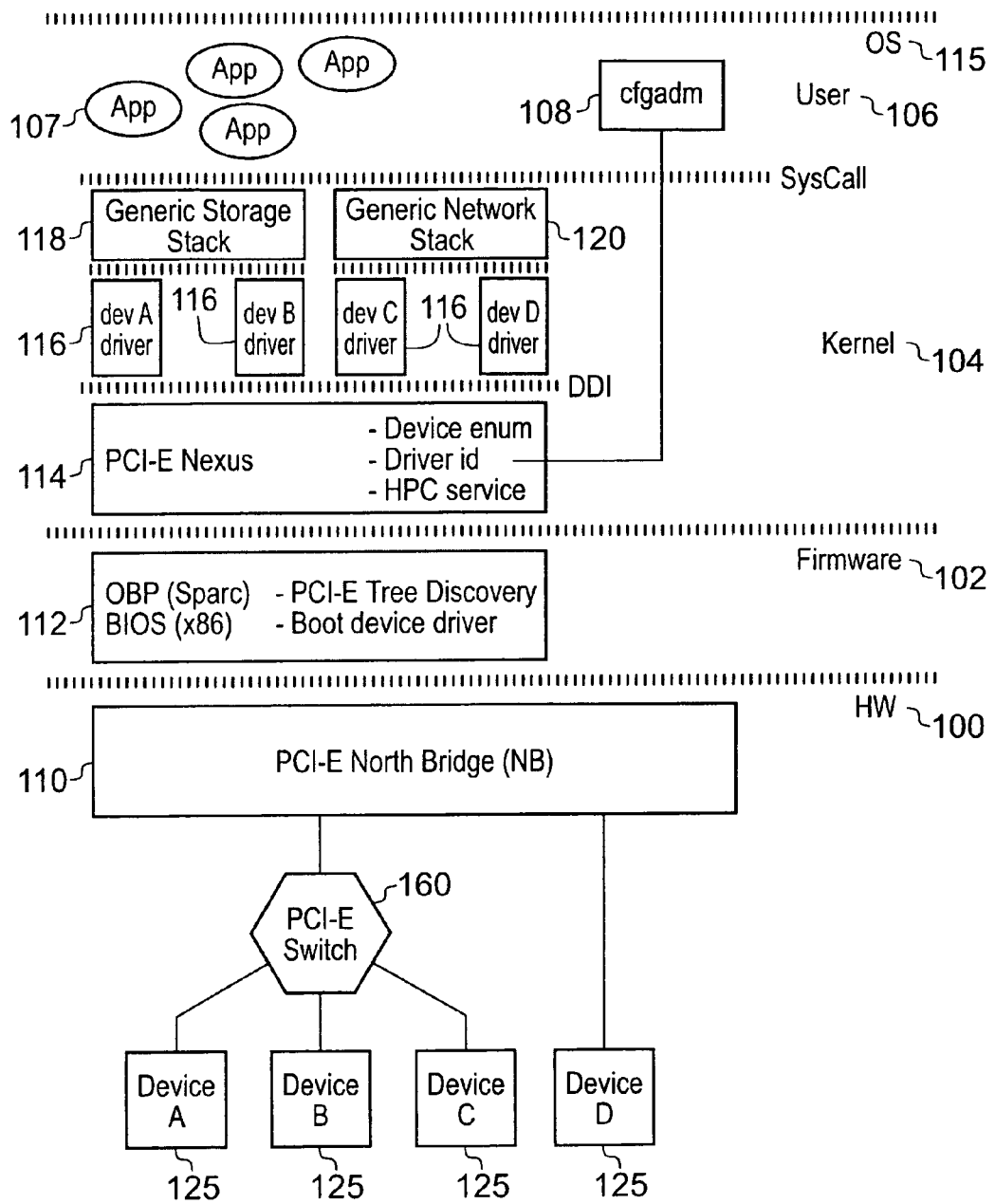
FIG. 8 is a schematic overview of an I/O software framework.

FIG. 8 provides a schematic overview of an example of an I/O software framework, in the present example a Solaris I/O software framework on a host. The software framework provides access to one or more I/O devices 125 via hardware 100 including a Northbridge 110 and a PCI-E switch 160. The platform (e.g., SPARC or x86) provides firmware 102 (e.g., OBP or BIOS 112) used before the operating system (OS) is booted. This firmware 102 and the OS software 115 combine to provide discovery and configuration (bus enumeration) of a PCI device tree. The Solaris OS run-time environment includes a kernel space 104 and a user space 106. A PCI-E Nexus driver (there are similar drivers in other operating systems) 114 in the kernel space 104 provides device enumeration, driver identification, drivers for the hostbridge and switches, and HPC (Hot-Plug Control) service. Each device 125 is handled either by a generic class driver or by a device specific driver 116 that interfaces to the (Solaris) environment via a Nexus device driver interface (DDI/DKI—Device Driver interface/Device Kernel Interface). Network device drivers interface to a generic OS network stack 120. Similarly, a generic storage stack 118 is provided for storage devices. In the user space 106, in which the applications 107 reside, device specific configuration commands and other generic commands for driver and device configuration could be issued through specific CLI (Command Line Interface) applications like cfgadm( ) and ifconfig( ) 108. It will be appreciated that other software frameworks are possible, for example a framework based on another operating system such as a Microsoft Windows OS, a Linux OS, etc.

Figure 9:
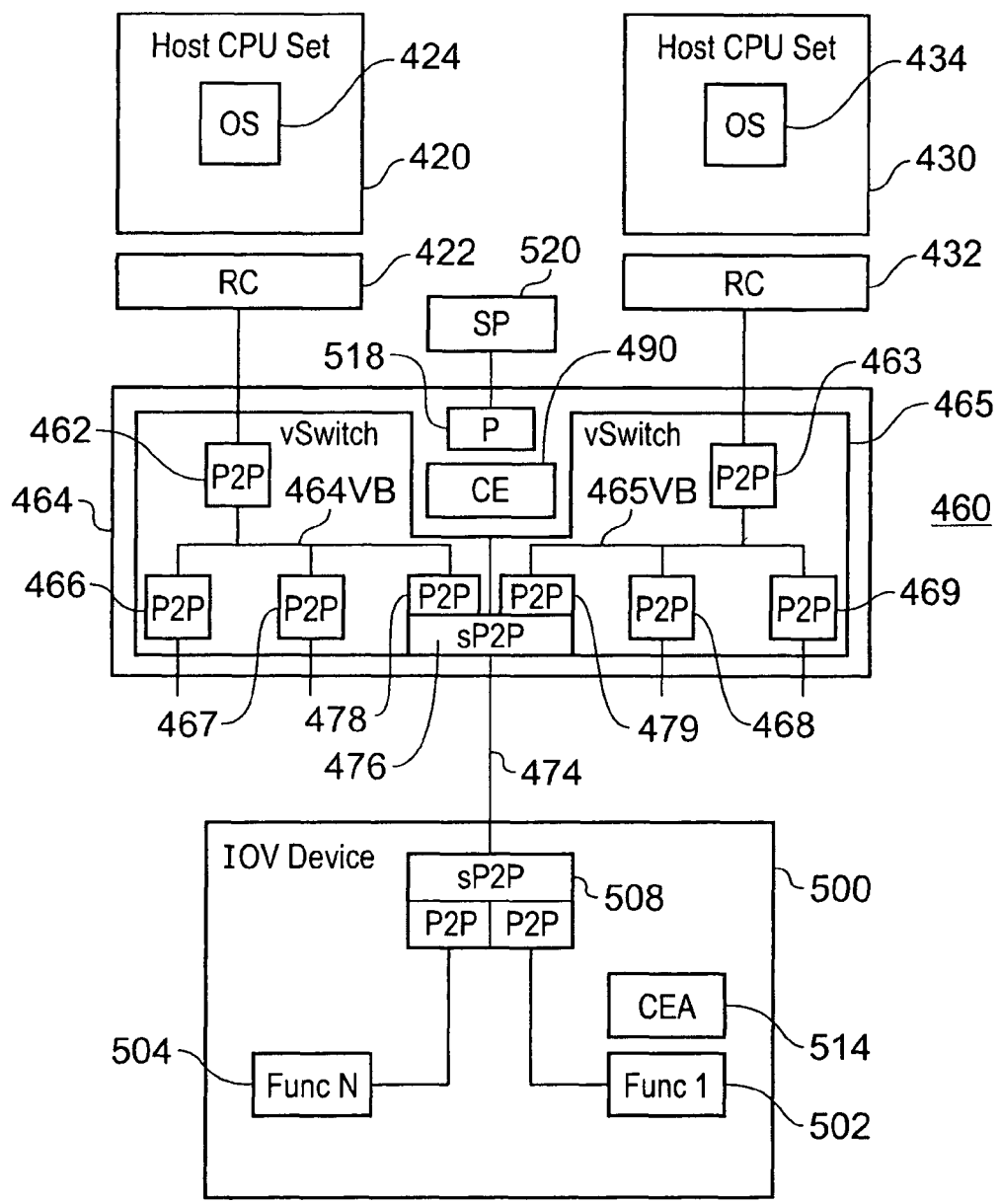
FIG. 9 is a schematic overview of an example embodiment of an interconnect apparatus.

FIG. 9 is a schematic overview of an example embodiment of an interconnect apparatus or device (e.g., a switch) 460 for multi-host PCI-E device sharing. Two hosts 420, 430, operating under an operating system (OS) 424, 434, are connected via Root Complexes (RCs) 422, 432 to respective upstream ports 462, 463 of a partitioned PCI-E Switch 460. The PCI-E Switch 460 is partitioned into two virtual switches (vSwitches 464, 465). In this example, each virtual switch contains a single upstream port (P2P) 462, 463, possibly one or more downstream non-shared ports (P2P) 466, 467, 468, 469 and one or more shared downstream ports (sP2P) 476. The P2P ports can be described as physical ports. A shared sP2P port 476 is operable to connect to a sharable device 500 (e.g., an I/O device, a switch, etc.) through a shared PCI-E link 474. The shared link is a PCI-E interface 474 shared by multiple virtual switches 464, 465. In this example, each virtual switch 464, 465 attaches to a shared port (sP2P) 476 through one or more P2P bridges 478, 479. The shared port 476 may be represented as multiple virtual ports, each being part of a separate virtual bridge complex. The shared port 476 contains a routing table, an address translation table (and/or a combined routing and address translation table) and virtual switch separation/protection. The sharable device 500 contains a number of resources 502, 504 that the configuration entity (CE) 490 provisions to the hosts 420, 430 via a shared device port 508. In the present instance, the configuration entity 490 is configured as part of the switch 460 of the interconnect apparatus. The configuration entity could be configured as part of a host, or some other entity (e.g., a service processor connected to the interconnect apparatus).

FIG. 9 further illustrates a dedicated port 518 that is connected to a service processor (SP) 520 that can be operable to provide management functions within the system. The service processor can be a general purpose microprocessor, including its own memory, storage etc.

The provisioning of the shared device resources 502, 504 can be determined by an out of band policy. The configuration entity 490 communicates with a configuration entity agent (CEA) 514 in the device that controls device resources that by nature are not sharable, e.g., reset, sharing policy, etc.).

Each resource 502, 504 in the device 500 is represented as a PCI device or a PCI function. Functions are provisioned by the configuration entity 490 to hosts 420, 430 (or system images within a host). Re-provisioning of functions to other system images can take place through PCI-E Hot-Remove/-Add interrupt events that the configuration entity 490 initiates through the configuration entity agent 514.

Only a Host 420, 430 or system image currently owning a function is allowed access to a function 502, 504. An access control mechanism per function 502, 504, can be provided.

In addition, to provide transparency for each host, each function can be configured to have a separate address space per function (configuration, I/O and memory address spaces per function). The host 420, 430, or system image, performs BAR configuration of the functions it currently owns.

A function in a shared device representing a resource 502, 504 (e.g., DMA machine) could be termed a virtual device (vDevice). A virtual device 500 being provisioned to a host 420, 430 can be presented to the Host as a device on the respective virtual PCI bus 464VB, 465VB of the respective virtual switches 464, 465 or as part of a virtual device hierarchy below a P2P port 476 of that virtual switch virtual PCI bus 464VB, 465VB.

Memory and I/O transaction layer packet (TLP) requests in the downward directions (from host to virtual device) can be routed based upon address until the shared port (sP2P) 476 as per the PCI-E specification. At the shared port (sP2P) 476, the Requester ID is replaced with the virtual host ID. Below the shared port (sP2P) 476, the TLP is primarily routed by the virtual host ID and secondarily by address (in case of the latter the virtual host ID is used as address qualifier).

The configuration entity 490 can be operable to control all aspects of a shared I/O device and/or I/O Service (IOU). In a shared device the configuration entity can implement the provisioning of device resources to client hosts.

The configuration entity 490 can provide a configuration space that holds configuration space registers. Configuration space registers of the configuration space can provide a presentation interface for the device to the host. They can provide a standardized mechanism for software (e.g., that of the software framework described with reference to FIG. 8) to be able to control controllable functions of one or more devices and to access status in respect of those functions.

In a conventional interconnect apparatus, such configuration space registers would be hardwired registers. Given that multiple configuration space registers are required to support a device and the functions thereof, that an interconnect apparatus can be operable to support many devices, and that such a device can in turn support other devices thereby providing a hierarchy of devices, a large number of registers can be required.

This problem can become dramatically more difficult when a large number of individual devices is to be configured in a consistent and synchronized manner to accurately reflect a dynamic change of system configuration.

Also, in order to associate access control mechanisms for dealing with the individual system views of a large number of hosts and/or individual system images within the various hosts, the set of selected hardware mechanisms and registers can be difficult to implement using dedicated hardware resources.

Not only does the number of registers take up a lot of real estate on an integrated circuit, the interconnects the registers require when implemented as flip-flops take up considerable area of an interconnection device and indeed can limit the available number of devices that can be supported.

In the following example embodiment, PCI configuration space operations are implemented using dedicated hardware to receive and send operations on PCI Express links, but forward configuration requests to a software-controlled processing entity (here a software-controlled general purpose processor). The processing entity can be embedded within the device itself and/or it can be associated with the device through some out-of-bound mechanism, and/or it can be available via the same PCI Express links from which the configuration space requests are received.

The software-controlled processing entity can correlate operations related to a large number of virtual resources within both a single and potentially multiple individual devices within the shared PCI Express system. The software-controlled processing entity can be configured to update internal state information before responding to an individual configuration response.

In order to allow "bootstrapping" of a PCI Express component via the PCI Express links, a two level approach to the configuration state can be implemented, whereby when operating at a first level, a simple device view can be presented to the software-controlled entity. Once the device has been configured at the first level, a switch to the second level can be made, whereby a software-based handling of configuration requests can be provided. This can involve forwarding all configuration requests to the software-controlled entity or it can involve cooperation between a local software-controlled entity and external management entities.

Figure 10:
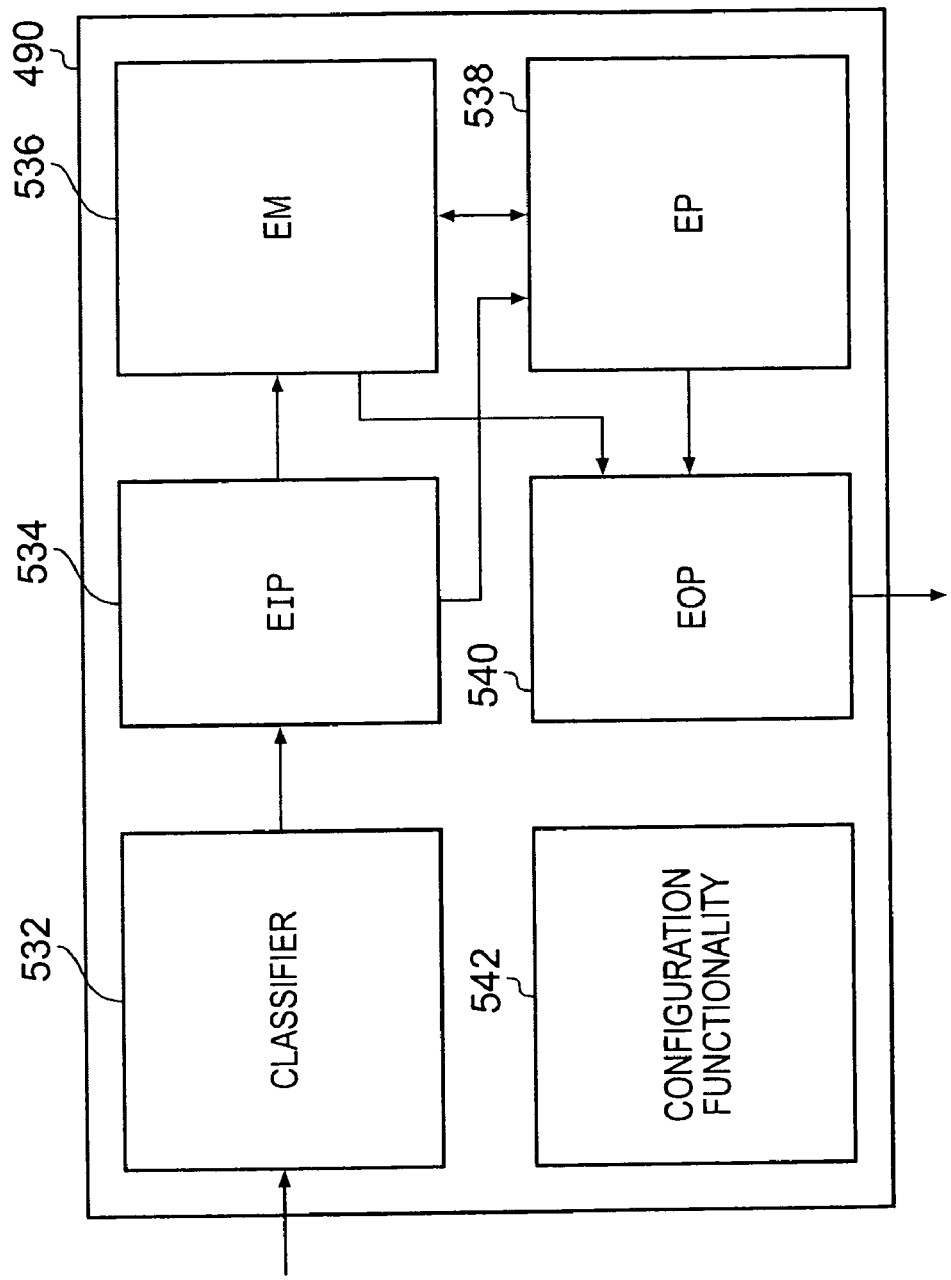
FIG. 10 provides an overview of an example of a configuration entity.

FIG. 10 provides an overview of an example of a configuration entity 490. As illustrated in FIG. 10, the configuration entity includes a classifier 532, an embedded input port (EIP) 534, embedded memory (EM) 536, an embedded processor (EP) 538 and an embedded output port (EOP) 540. The configuration entity 490 can include further functional configuration functionality 542 as required.

Conceptually, the classifier 532 is part of the configuration entity. However, in an example embodiment a classifier 532 is configured as a hardware mechanism in close relation to an input port to enable the classification of packets at wire speed. The classifier 532 can be associated with each input port and can comprise hardware logic operable to extract configuration space operation packets and hardware logic operable to forward these packets to an embedded input queue (in the present example a single embedded queue) of the configuration entity. Thus the classifier logic can be associated with input ports such as the input ports 462 and 463 illustrated in FIG. 9 and can be operable to analyze a packet header in accordance with rules hardwired into the classifier or held in a look up table forming part of the classifier. For example the rules can identify a received packet as a configuration space operation packet where an address in a header of the received packet falls within a predetermined address space. The classifier 532 can be implemented, for example, in the form of hardwired logic.

The embedded input port 534 is operable to receive packets from an input port such as the input ports 462 and 463 under the control of the classifier.

The embedded memory 536 can be implemented, for example, as random access memory. If the embedded memory 536 is implemented at least in part as non-volatile random access memory, information held in non-volatile memory can be maintained even if a power supply thereto is lost. The embedded memory can be operable to hold local policy information and/or software configured configuration registers and/or program code for controlling the embedded processor 538.

The embedded processor 538 can be operable under software control to perform configuration operations and operations described with reference to FIGS. 11 to 13.

The embedded processor 538 can be implemented as general purpose processor or microcontroller operable under software control.

The embedded output port 540 is operable to output packets from the embedded processor 536 via the switching matrix of the interconnect device.

Figure 11:
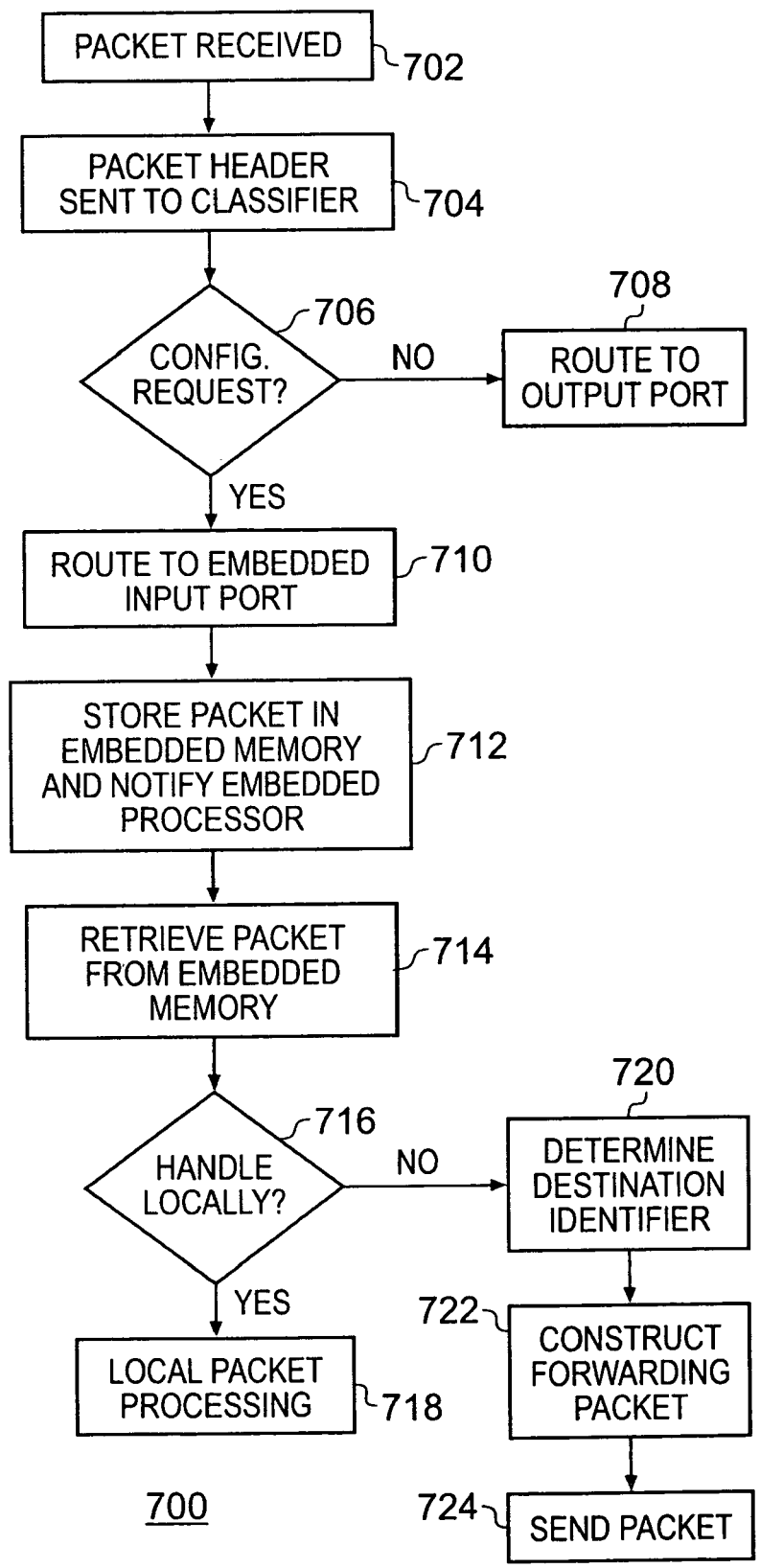
FIG. 11 is a flow diagram illustrating an example of PCI Express packet flow interception.
Figure 12:
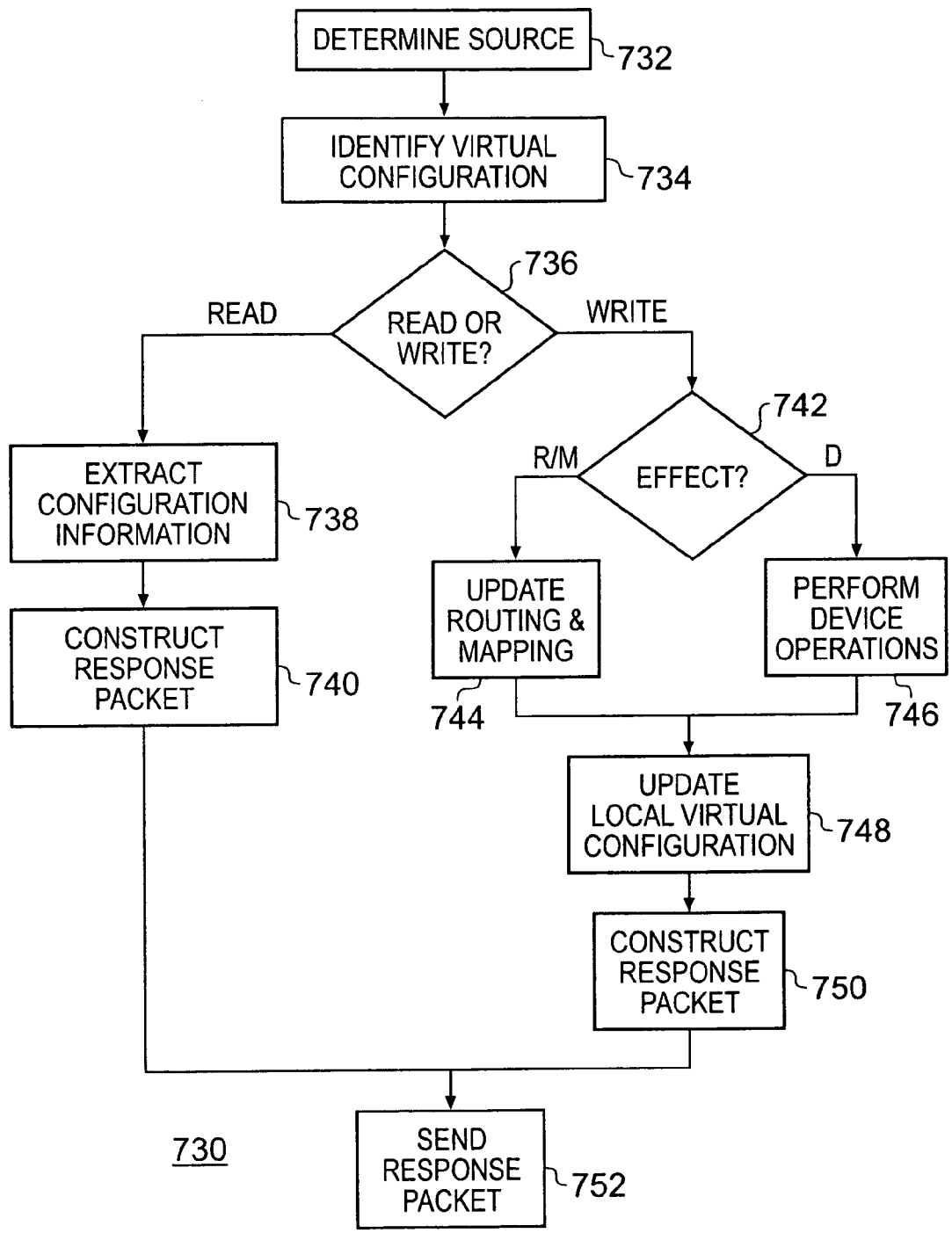
FIG. 12 is a flow diagram illustrating an example of configuration packet processing.
Figure 13:
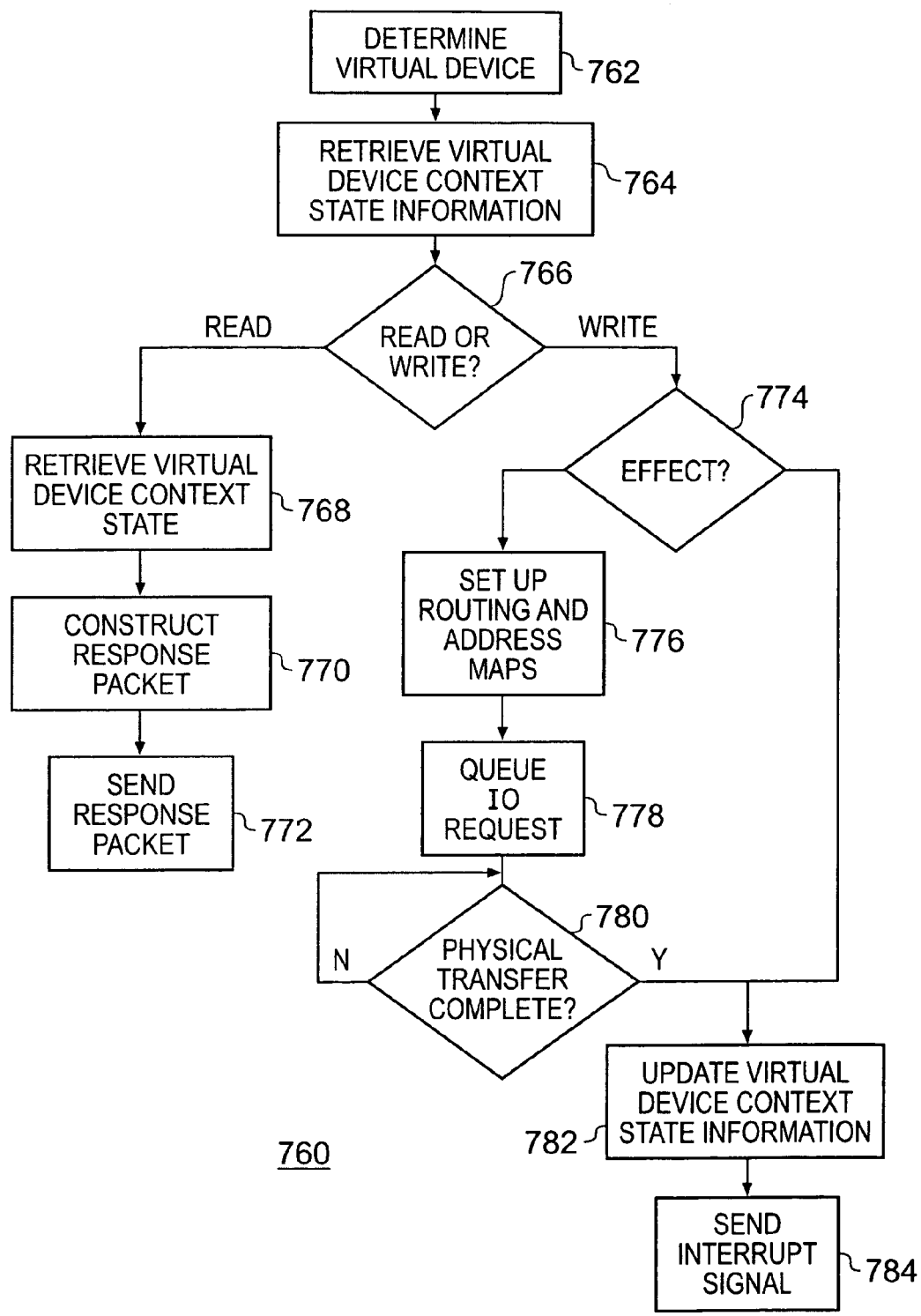
FIG. 13 is a flow diagram illustrating an example of configuration status register packet processing.

FIGS. 11 to 13 are flow diagrams illustrating examples of the handling of packet interception in an interconnect apparatus such as a switch, the handling of PCI configuration operations and the handling of device configuration space register access, respectively.

FIG. 11 is a flow diagram illustrating an example of PCI Express packet flow interception 700.

In step 702 the packet arrives at an input port (e.g., 462, 463).

In step 704 the packet header info is sent to the classifier 532.

In step 706, the classifier 532 determines whether the packet comprises a configuration request that should be intercepted.

If, in step 706, it is determined that the packet is not one that should be intercepted, then in step 708 it is routed to an output port (e.g., 466, 467, 468, 469, 476) according to normal routing rules.

If, in step 706, it is determined that the packet is one that should be intercepted, then in step 710 the packet is routed to the embedded input port 534.

In step 712, the embedded input port 534 places the packet in the embedded memory 536 and notifies the embedded processor 538.

In step 714, the embedded processor 538 retrieves the packet from the embedded memory 536 and in step 716 the embedded processor 538 checks local policy information held in the embedded memory 536 as well as the packet type to determine whether the packet should be handled locally.

If in step 716, the embedded processor 538 determines that the packet should be handled locally, then in step 718, the embedded processor 538 performs local packet processing. It should be noted that this processing can also include the handling of packets that are sent to a remote entity via out of bounds (OOB) channels such as an Ethernet port.

If in step 716, the embedded processor 538 determines that the packet should not be handled locally, then in step 720 the embedded processor 538 determines a destination identifier based on packet header information and the local policy information held in the embedded memory 536, the destination identifier identifying handler logic that is operable to perform packet processing.

The embedded processor 538 is then operable in step 722 to construct a forwarding packet with the destination identifier and the original packet as payload and in step 724 to send the packet to correct the physical output port via the embedded output port 540 and the switching matrix of the interconnected device.

A configuration processor forming a software-controlled entity can be operable to perform configuration packet processing. The configuration processor can be a processor embedded in an interface apparatus such as switch (for example the embedded processor 538 referenced above) or it can be external processor, for example in a further interface apparatus (not shown), a service processor 520, a root complex 422, 432 or a host processor 420 or 430.

In the following description, where reference is made to a configuration processor, it should be understood that this could be an embedded processor or an external processor such as a service processor.

FIG. 12 is a flow diagram illustrating an example of configuration packet processing 730.

In step 732, the configuration processor determines the source of a received packet (e.g., which host) from source information in the received packet header.

In step 734, the configuration processor performs a look up for virtual configuration information for the host concerned.

In step 736, the configuration processor determines whether a read configuration operation or a write configuration operation is to be performed as determined by the packet header content.

If, in step 736, the configuration processor determines that a read configuration operation is to be performed, then in step 738, the configuration processor extracts the relevant configuration information from the virtual configuration for the host concerned and in step 740, the configuration processor constructs a response packet.

If, in step 736, the configuration processor determines that a write configuration operation is to be performed, then in step 742, the configuration processor determines the effect of a write on the virtual configuration.

If in step 742, the configuration processor determines that the effect of a write on the virtual configuration implies updating routing and mapping information within the fabric, then in step 744, the configuration processor updates the routing and mapping information.

If in step 742, the configuration processor determines that the effect of a write on the virtual configuration implies updating any physical device state (e.g. real configuration registers on a real device), then in step 746 the configuration processor performs device operations (e.g., generates a series of request packets and verifies that proper responses are received).

Following step 744 and/or step 746, in step 748 the configuration processor updates local virtual configuration information with the new state information.

In step 750 the configuration processor constructs a response packet.

Following step 740 or step 750, in step 752 the configuration processor sends a response packet (e.g., via the embedded output port 540 when this configuration processor is an embedded processor)

FIG. 13 is a flow diagram illustrating an example of configuration status register packet processing 760.

In step 762 the configuration processor determines a virtual device based on a source identifier and address information from a received packet.

In step 764 the configuration processor performs a look up for virtual device context information from the configuration processor memory.

In step 766, the configuration processor determines whether a read configuration operation or a write configuration operation is to be performed as determined by the packet header content.

If, in step 766, the configuration processor determines that a read configuration operation is to be performed, then the configuration processor:
    in step 768 retrieves relevant virtual device context state information;
    in step 770, constructs a response packet; and
    in step 772 sends the response packet.

If, in step 766, the configuration processor determines that a write configuration operation is to be performed, then in step 774 the configuration processor determines the effect on the virtual device.

If, in step 774, the configuration processor determines that the new virtual device context state information implies that a virtual IO request has been defined for the virtual device, then the configuration processor:

in step 776 sets up routing and address maps; and in step 778 queues a real IO request for at least one physical device that will be handled by a real driver (the request specifies data buffer addresses that are mapped to the relevant host buffers).

When the physical transfer is complete (step 780) following step 778, or if in step 774 the configuration processor determines that the new virtual device context state information does not imply that a virtual IO request has been defined for the virtual device, the configuration processor updates virtual device context state information in step 782. Updating the virtual device context state information can include fetching data from a host memory in the case of "doorbell"-like write operation.

The configuration processor then sends an interrupt message (or signal) in step 784 to the appropriate host if required for a virtual device specification.

As indicated above, the configuration processor can be the embedded processor or an external processor as required in an implementation.

Although the flow diagrams of FIGS. 11 to 13 are directed to handling initiated in a switch or other interconnect apparatus, the method of FIGS. 11 to 13 are also applicable where interception takes place within a host in which a virtualization software layer (e.g. a hypervisor) handles all access to hardware via an API (or by trapping load and store operations to certain address areas).

In such a case, the trapping can be implemented within the context of a packet switching fabric. Device CSR access can be intercepted within a host local hypervisor context and then be aggregated (e.g., several CSR accesses are interpreted and translated into a higher level operation such as a "send packet onto the external link of the device". This higher level operation can then be sent as a request message to a proxy implementation somewhere within the fabric.

Accordingly, there has been described an apparatus, a system and a method wherein a register access request for control and/or status operations from a link is detected using a hardware mechanism and is forwarded to a software-controlled entity for access to a virtual register for control and/or status operations.

The software-controlled entity can provide virtual registers in memory associated with the software-controlled entity. The hardware mechanism can form part of an interconnect device and the software-controlled entity is external to the interconnect device.

Virtual configuration state registers can be implemented outside an JO device that is used to implement basic JO. For example, it can be implemented in a switch that connects to the device, with the switch presenting virtual device instances to the relevant host(s) and providing configuration space register virtualization.

A software-controlled processing entity can then correlate operations related to a large number of virtual resources within both a single and potentially multiple individual devices within a shared PCI Express system.

A software-controlled processing entity can implement multiple virtual direct memory access (DMA) engines or work queues so that the virtual DMA engines can be multiplexed onto one or more hardware DMA engines on one or more physical devices.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

The invention claimed is:

1. An apparatus separate from a physical device, comprising:

an interface configured to intercept traffic for the physical device; and a hardware mechanism configured to:

extract from the traffic a packet that includes a register access request for control and/or status configuration operations for the physical device;

send other traffic to a physical output port which is coupled to the physical device; and for the packet that is extracted:

use the packet and policy information for the hardware mechanism to determine whether the packet is to be processed by the hardware mechanism;

if the packet is to be processed by the hardware mechanism, forward the register access request to a software-controlled entity for access to a virtual configuration space register;

otherwise, if the packet is not to be processed by the hardware mechanism:

use the packet and the policy information to determine a destination identifier for the packet; and send a forwarding packet that includes the packet and the destination identifier to a physical output port for the hardware mechanism.

2. The apparatus of claim 1, wherein the software-controlled entity provides virtual registers in memory associated with the software-controlled entity.

3. The apparatus of claim 1, wherein the hardware mechanism forms part of an interconnect device and the software-controlled entity is external to the interconnect device.

4. The apparatus of claim 1, wherein the hardware mechanism is operable to forward the register access request to the software-controlled entity via an interface dedicated to the software-controlled entity.

5. The apparatus of claim 1, wherein the hardware mechanism is operable to forward the register access request to the software-controlled entity via a link on which the register access request is received.

6. The apparatus of claim 1, wherein the hardware mechanism is operable to forward the register access request to the software-controlled entity via a link other than the link on which the register access request is received.

7. The apparatus of claim 1, wherein the hardware mechanism forms part of an interconnect device and the software-controlled entity is integral to the interconnect device.

8. The apparatus of claim 1, wherein the software-controlled entity is a service processor.

9. The apparatus of claim 1, wherein the software-controlled entity is a root complex.

10. The apparatus of claim 1, wherein the hardware mechanism forms part of an interconnect device, and the software-controlled entity forms part of a further interconnect device.

11. The apparatus of claim 1, wherein the hardware mechanism forms part of a switch.

12. The apparatus of claim 1, wherein the register access request is a CSR (Configuration Space Register) access request.

13. The apparatus of claim 12, wherein the register access request is a PCI (Peripheral Component Interconnect) Express compatible CSR access request.

14. The apparatus of claim 1, wherein the software-controlled entity implements virtual CSR (Configuration Space Register) registers.

15. The apparatus of claim 1, wherein the traffic for the physical device is traffic from a first processor, wherein the first processor is separate from the apparatus;
wherein the hardware mechanism includes the software-controlled entity, wherein the software-controlled entity includes a second processor.

16. The apparatus of claim 1, wherein forwarding the register access request to the software-controlled entity involves sending the packet to a remote entity via an out of bounds (OOB) channel.

17. The apparatus of claim 1, wherein forwarding the register access request to the software-controlled entity involves:
if the register access request includes a write operation that involves updating a physical device state:
generating a request packet for the physical device;
sending the request packet to the physical device to perform an operation on the physical device; and
verifying that a response is received from the physical device in response to the request packet.

18. A computer system comprising an interconnect apparatus separate from a physical device, the interconnect apparatus comprising:
a processor;
an interface configured to intercept traffic for the physical device; and
a hardware mechanism configured to:
extract from the traffic a packet that includes a register access request for control and/or status configuration operations for the physical device;
send other traffic to a physical output port which is coupled to the physical device; and
for the packet that is extracted:
use the packet and policy information for the hardware mechanism to determine whether the packet is to be processed by the hardware mechanism;
if the packet is to be processed by the hardware mechanism, forward the register access request to a software-controlled entity for access to a virtual configuration space register;
otherwise, if the packet is not to be processed by the hardware mechanism:
use the packet and the policy information to determine a destination identifier for the packet; and
send a forwarding packet that includes the packet and the destination identifier to a physical output port for the hardware mechanism.

19. A method comprising:
receiving at a processor separate from a physical device traffic for the physical device;
extracting from the traffic a packet that includes a register access request for control and/or status configuration operations for the physical device;
sending other traffic to a physical output port which is coupled to the physical device; and
for the packet that is extracted:
using the packet and policy information for the hardware mechanism to determine whether the packet is to be processed by the hardware mechanism;
if the packet is to be processed by the hardware mechanism, forwarding the register access request to a software-controlled entity for access to a virtual configuration space register;
otherwise, if the packet is not to be processed by the hardware mechanism:
using the packet and the policy information to determine a destination identifier for the packet; and
sending a forwarding packet that includes the packet and the destination identifier to a physical output port for the hardware mechanism.

* * * * *